US012002638B2

(12) United States Patent
Lee

(10) Patent No.: US 12,002,638 B2
(45) Date of Patent: Jun. 4, 2024

(54) BYPASS SWITCH

(71) Applicant: LS ELECTRIC CO., LTD., Anyang-si (KR)

(72) Inventor: Gyeongho Lee, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 199 days.

(21) Appl. No.: 17/612,059

(22) PCT Filed: Apr. 24, 2020

(86) PCT No.: PCT/KR2020/005411
§ 371 (c)(1),
(2) Date: Nov. 17, 2021

(87) PCT Pub. No.: WO2020/242063
PCT Pub. Date: Dec. 3, 2020

(65) Prior Publication Data

US 2022/0246376 A1 Aug. 4, 2022

(30) Foreign Application Priority Data

May 24, 2019 (KR) ........................ 10-2019-0061402
May 24, 2019 (KR) ........................ 10-2019-0061405

(51) Int. Cl.
*H01H 33/662* (2006.01)
*H01H 33/664* (2006.01)
*H01H 33/666* (2006.01)

(52) U.S. Cl.
CPC ........ *H01H 33/662* (2013.01); *H01H 33/664* (2013.01); *H01H 33/666* (2013.01)

(58) Field of Classification Search
CPC .. H01H 33/662; H01H 33/664; H01H 33/666; H01H 33/6606; H01H 33/66207;
(Continued)

(56) References Cited

U.S. PATENT DOCUMENTS 4,224,491 A * 9/1980 Kroon .................... H01H 39/00
337/401
6,518,865 B1 * 2/2003 Al-Hosini ............ H01H 33/285
335/147
(Continued)

FOREIGN PATENT DOCUMENTS

CN 106710898 A 5/2017
CN 107086164 A 8/2017
(Continued)

OTHER PUBLICATIONS

International Search Report for related International Application No. PCT/KR2020/005411; report dated Dec. 3, 2020; (5 pages).
(Continued)

*Primary Examiner* — William A Bolton
(74) *Attorney, Agent, or Firm* — K&L Gates LLP

(57) ABSTRACT

The present disclosure relates to a bypass switch used in a super-high voltage direct current transmission sub-module including a case; a first bus bar; a second bus bar; a fixing contact provided in a hollow part and connected to the first bus bar; a movable contact provided in the hollow part, and connected to the second bus bar so as to come into contact with or be separated from the fixing contact; an insulating cover coupled to the rear surface of the second bus bar, and having an accommodation part therein; a movable part extension rod provided on the accommodation part and coupled to the movable contact; and an actuator provided on the rear part of the insulating cover, and providing power for moving the movable part extension rod.

12 Claims, 7 Drawing Sheets

(58) Field of Classification Search

CPC ............ H01H 2033/6665; H01H 1/50; H01H 39/004; H01H 39/002; H01H 39/006; H01H 2039/008; H01H 79/00; H01H 2239/044

USPC ........................................ 218/139, 134, 95

See application file for complete search history.

(56) References Cited

U.S. PATENT DOCUMENTS

| | | | | |
|---|---|---|---|---|
| 8,859,927 B2 * | 10/2014 | Anheuer | H01H 33/6606 218/120 |
| 9,679,710 B1 * | 6/2017 | Schaar | H01H 9/0038 |
| 9,799,473 B2 * | 10/2017 | Jung | H01H 39/002 |
| 9,953,779 B2 * | 4/2018 | Jung | H01H 39/004 |
| 2011/0315662 A1 | 12/2011 | Byron et al. | |

FOREIGN PATENT DOCUMENTS

| | | | |
|---|---|---|---|
| CN | 108231471 | A | 6/2018 |
| CN | 109036957 | A | 12/2018 |
| CN | 109192616 | A | 1/2019 |
| EP | 3043368 | A1 | 7/2016 |
| EP | 3208825 | A1 | 8/2017 |
| JP | 2016131142 | A | 7/2016 |
| JP | 2017147216 | A | 8/2017 |
| KR | 20110091520 | A | 8/2011 |
| KR | 101148372 | B1 | 5/2012 |
| KR | 101613812 | B1 | 4/2016 |
| KR | 20170090928 | A | 8/2017 |
| KR | 20170096539 | A | 8/2017 |
| KR | 101870016 | B1 | 7/2018 |

OTHER PUBLICATIONS

Written Opinion for related International Application No. PCT/KR2020/005411; report dated Dec. 3, 2020; (6 pages).

Korean Office Action for related Korean Application No. 10-2019-0061405; action dated Jun. 16, 2020; (4 pages).

Korean Office Action for related Korean Application No. 10-2019-0061402; action dated Jun. 16, 2020; (4 pages).

Notice of Allowance for related Korean Application No. 10-2019-0061405; action dated Dec. 1, 2020; (2 pages).

Notice of Allowance for related Korean Application No. 10-2019-0061402 action dated Dec. 1, 2020; (2 pages).

Notice of Allowance for related Japanese Patent Application No. 2021-568639; action dated Feb. 28, 2023; (3 pages).

Extended European Search Report for related European Application No. 20814103.6; action dated May 25, 2023; (12 pages).

Office Action for Chinese Application No. 202080038236.8; action dated Apr. 13, 2024; (10 pages).

* cited by examiner

BYPASS SWITCH

CROSS-REFERENCE TO RELATED APPLICATIONS

This application is the National Stage filing under 35 U.S.C. 371 of International Application No. PCT/KR2020/005411, filed on Apr. 24, 2020, which claims the benefit of earlier filing date of and right of priority to Korean Application No. 10-2019-0061402 filed on May 24, 2019 and Korean Application No. 10-2019-0061405 filed on May 24, 2019, the contents of which are all hereby incorporated by reference herein in their entirety.

FIELD

The present disclosure relates to a bypass switch, and more particularly, to a bypass switch used in a sub-module of a high voltage direct current (HVDC) transmission system.

BACKGROUND

In general, a High Voltage Direct Current (HVDC) transmission system is a power transmission facility that AC power generated in a power plant is transmitted after being converted into DC power in a transmission site and the DC power is supplied after being re-converted into AC power in a reception site. When DC transmission is applied, there is an advantage in that transmission loss is greatly reduced compared to AC transmission.

An HVDC transmission system requires converters for converting electricity from AC power into DC power or from DC power into AC power, and these converters include a plurality of sub-modules.

When a failure occurs in some of the plurality of sub-modules, a configuration or device for excluding the failed sub-modules from the transmission system is required for normal power transmission.

One of devices used for this purpose is a bypass switch. A bypass switch is provided in a converter used in the HVDC transmission system, a Static Synchronous Compensator (STATCOM), or a Static Var Compensator (SVC), so as to be used as a high-speed short-circuit bypass switch to quickly short-circuit some components when those components fail.

That is, the bypass switch is provided in a converter formed in a combination of a plurality of sub-modules. When a fault, such as a failure, of any sub-module is detected, the faulty sub-module is short-circuited to prevent an effect due to the failure from being propagated to other adjacent sub-modules. (An overview of operations of sub-modules and bypass switches in an HVDC may be understood by referring to Korean Patent Registration No. 10-1613812 that discloses “Bypass switch for HVDC”.)

FIGS. 1 and 2 are views illustrating configuration and operation of a bypass switch according to the related art. FIG. 1 illustrates an open state and FIG. 2 illustrates a closed state. (FIGS. 1 and 2 illustrate “Bypass Switch” disclosed in Korean Patent Application No. 10-2016-0018051 filed by the Applicant of the present disclosure.)

The bypass switch has appearance that is defined by a first bus bar 6 and a second bus bar 7 disposed to be spaced apart from each other, and a case 1 provided between the first bus bar 6 and the second bus bar 7. A fixed contact 22 connected to the first bus bar 6 and a movable contact (moving contact) 22 connected to the second bus bar 7 to be brought into contact with or separated from the fixed contact 22 are installed in the case 1. Here, the fixed contact 22 and the movable contact 21 are constituent parts of a vacuum interrupter 2.

An actuator (inflator) 52 is provided as a driving source for operating the movable contact 21. The actuator 52 is exploded by an electrical signal to supply driving force for moving the movable contact 21. The actuator 52 is connected to the movable contact 21 sequentially via a pin 33, a latch plate 32, and a movable part extension rod 31.

As described above, in the HVDC transmission system constituted by a series combination of the plurality of sub-modules, when a fault, such as an internal failure, is detected in any sub-module, the high-speed bypass switch quickly separates the faulty sub-module for a continuous normal operation of the system, so as to prevent propagation of the failure to adjacent sub-modules and thereby protect the system. This high-speed bypass switch is kept open during a normal condition, and then is quickly closed upon a failure of a sub-module to provide a bypass for the corresponding sub-module.

The maintenance of the open state of the high-speed bypass switch is made by magnetic force of a permanent magnet 4. The movable contact 21 is separated from the fixed contact 22 as the latch plate 32 is attracted to the permanent magnet 4 by the magnetic force of the permanent magnet 4 disposed adjacent to the actuator 52, and the open state is maintained accordingly. Since the latch plate 32 is coupled to the movable contact 21 through the movable part extension rod 31, when the latch plate 32 is attracted to the permanent magnet 4, the movable contact 21 also moves to be separated from the fixed contact 22.

When a sub-module fails, the actuator 52 receives an external firing signal (electrical signal) and a micro-gas generator operates to emit high-pressure gas. The high-pressure gas pushes a piston 51 mounted in the actuator 52 such that the latch plate 32 is separated from a magnetic holder 41 to which the permanent magnet 4 is fixed. At this time, a movable part extension rod 31 connected to the latch plate 32 and the movable contact 21 of the vacuum interrupter 2 move together, and finally the movable contact 21 and the fixed contact 22 of the vacuum interrupter 2 are brought into contact with each other, such that a current can flow. FIG. 2 illustrates a path along which a current i flows.

Here, a spring 48 serves to push the movable contact 21 with a specific force while the contacts 21 and 22 are in the closed state. The spring 48 serves to apply contact pressure (or force) to prevent the contacts 21 and 22 of the vacuum interrupter 2 from being separated from each other due to contact repulsion force generated by the current and external vibration.

By the way, in the high-speed bypass switch according to the related art, the actuator 52 serving as the power source for a closing operation is mounted adjacent to the second bus bar 7 through which a high-pressure current flows. For this reason, an insulation design for a portion where the actuator 52 is installed and an external device that sends a firing signal is additionally required, and noise generation due to a high-pressure firing signal may increase.

In addition, the spring 48 for applying the contact pressure to the latch plate 32 is inserted between the latch plate 32 and the magnet holder 41. This causes a limit in an installation space of the spring 48, and thereby it is difficult to exert sufficient contact pressure. Therefore, a spring with a large spring constant is required in order to exert necessary contact pressure. A spring having a large spring constant (k) is not only difficult to be manufactured, but also expensive.

In addition, when a spring having a large spring constant is used, a small deformation ($\Delta x$) causes a great change in contact pressure force ($F=k\times\Delta x$), which makes it difficult to control the stroke of the movable contact 21 of the bypass switch.

SUMMARY

The present disclosure has been devised to solve the above-described problems, and one aspect of the present disclosure is to provide a bypass switch with improved insulation performance between an actuator and a bus bar.

Another aspect of the present disclosure is to facilitate design or application of a spring by providing a spring operating space inside a movable part extension rod.

A bypass switch according to one aspect of the present disclosure may include a case in which a hollow part is defined, a first bus bar coupled to a front end of the case, a second bus bar coupled to a rear end of the case, a fixed contact disposed in the hollow part and connected to the first bus bar, a movable contact disposed in the hollow part and connected to the second bus bar to be brought into contact with or separated from the fixed contact, an insulating cover coupled to a rear surface of the second bus bar and having an accommodation part therein, a movable part extension rod disposed in the accommodation part and coupled to the movable contact, and an actuator disposed on the rear of the insulating cover to apply power to move the movable part extension rod.

Here, the second bus bar may include a contactor connection part implemented as a through hole, and the bypass switch may further include a multi-contactor socket inserted into the contactor connection part, formed in a cylindrical shape to surround and support the movable part extension rod.

The bypass switch may further include a multi-contactor closely disposed between the multi-contactor socket and the movable part extension rod.

The bypass switch may further include an end cover coupled to the rear of the insulating cover and having a mounting part in a shape of a groove in which the actuator is disposed.

A fixing part may be stepped with an increased diameter on a front end part of the insulating cover, and the insulating cover may be integrally coupled to the second bus bar and the case by coupling members coupled to the fixing part.

The bypass switch may further include a contact spring disposed between the movable part extension rod and the end cover to apply contact pressure to the movable contact.

The end cover may be provided with a central pipe part inserted into a cover through hole of the insulating cover to support the contact spring.

The movable part extension rod may be provided with an operation part formed in a shape of a groove open rearward, and the bypass switch may further include a push rod disposed on a front surface of the operation part to receive force of the contact spring.

The bypass switch may further include a permanent magnet coupled to a rear surface of the accommodation part, and a latch plate coupled to the movable part extension rod, and attracted to the permanent magnet in a normal state such that the movable contact is separated from the fixed contact.

The bypass switch may further include an outer holder and an inner holder respectively disposed on both side surfaces of the permanent magnet to support the permanent magnet.

In addition, the outer holder, the inner holder, the insulating cover, and the end cover may be integrally coupled by coupling members.

The mounting part may be provided with a cap to fix the actuator.

A bypass switch according to another aspect of the present disclosure may include a case in which a hollow part is defined, a first bus bar coupled to a front end of the case, a second bus bar coupled to a rear end of the case, a fixed contact disposed in the hollow part and connected to the first bus bar, a movable contact disposed in the hollow part and connected to the second bus bar to be brought into contact with or separated from the fixed contact, a movable part extension rod disposed at the second bus bar, coupled to the movable contact, and having an operation part formed in a shape of a groove open rearward, an actuator disposed at the rear of the movable part extension rod to apply force for moving the movable part extension rod, and a contact spring disposed on the operation part to apply contact pressure to the movable contact.

Here, the second bus bar may include a contactor connection part implemented as a through hole, and the bypass switch may further include a multi-contactor socket inserted into the contactor connection part, formed in a cylindrical shape to surround and support the movable part extension rod.

The bypass switch may further include a multi-contactor closely disposed between the multi-contactor socket and the movable part extension rod.

The bypass switch may further include an insulating cover coupled to a rear surface of the second bus bar and having an accommodation part with a front opening, and an end cover coupled to the rear of the insulating cover and having a mounting part in which the actuator is disposed.

The bypass switch may further include a push rod provided in a front end of the operation part to receive force by the contact spring.

The bypass switch may further include a magnetic latch to attract the movable part extension rod by magnetic force, and the magnetic latch may include a permanent magnet mounted on a rear surface of the accommodation part, and an outer holder and an inner holder to support the permanent magnet.

The operation part may be provided with a latch coupling part formed in a stepped shape to have an increased inner diameter, and the bypass switch may further include a latch plate coupled to the latch coupling part to be attracted by magnetic force of the permanent magnet.

The latch plate may be provided with a rod coupling part protruding therefrom into a shape of a pipe to be inserted into the latch coupling part.

The bypass switch may further include an insulating push rod coupled to a rear end of the push rod and inserted through the latch plate to receive force of the actuator.

The push rod may be spaced apart from the magnetic latch.

A rear end part of the push rod may be disposed ahead of a front end part of the magnetic latch.

The end cover may be provided with a central pipe part inserted into a cover through hole of the insulating cover to support the contact spring.

A front end part of the central pipe part may protrude forward to be located ahead of a front end part of the magnetic latch.

The mounting part may be provided with a cap to fix the actuator.

In a bypass switch according to one implementation of the present disclosure, an insulating cover may be applied between an actuator serving as a power source of a closing operation of a movable contact and a second bus bar, through which a high-pressure current flows, thereby securing insulation. That is, a circuit part including a first bus bar connected to a power source and a second bus bar connected to a load and an actuator part can be insulated from each other by the insulating cover.

Accordingly, an insulation design for an external firing device connected to the actuator may be unnecessary. Also, the actuator may receive a firing signal (electrical signal) based on the ground. This may result in reducing the probability of generating noise in the firing signal, thereby allowing an accurate and stable operation of the bypass switch.

Meanwhile, a movable part extension rod may be formed in a cylindrical shape to define a space for mounting and operating a contact spring. Therefore, a special spring having a large spring coefficient may not be required, and a commercially available spring can be applied.

This may improve contact pressure with respect to a movable contact, and reduce the weight of entire components.

In addition, an operating speed of the bypass switch can be improved, thereby reducing a closing time.

This may also facilitate a stroke control for the movable contact.

A latch plate may partially be inserted into the movable part extension rod so as to stably operate without shaking.

BRIEF DESCRIPTION OF THE DRAWINGS

FIG. 1 illustrates an open state and FIG. 2 illustrates a closed state.

FIG. 6 illustrates an open state and FIG. 7 illustrates a closed state.

DETAILED DESCRIPTION

Hereinafter, preferred implementations of the present disclosure will be described with reference to the accompanying drawings, so that a person skilled in the art can easily carry out the disclosure. It should be understood that the technical idea and scope of the present disclosure are not limited to those preferred implementations.

Figure 1:
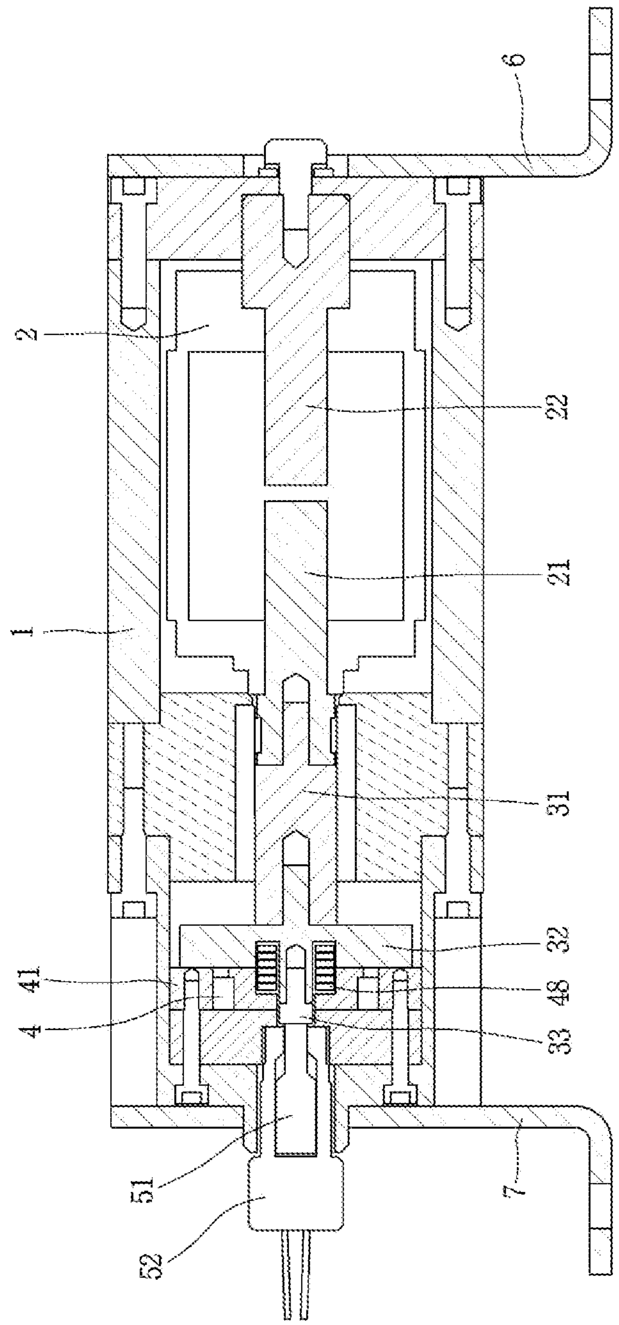
Fig. 1 Prior Art
FIGS. 1 and 2 are views illustrating operating states of a bypass switch for an HVDC transmission module according to the related art.
Figure 2:
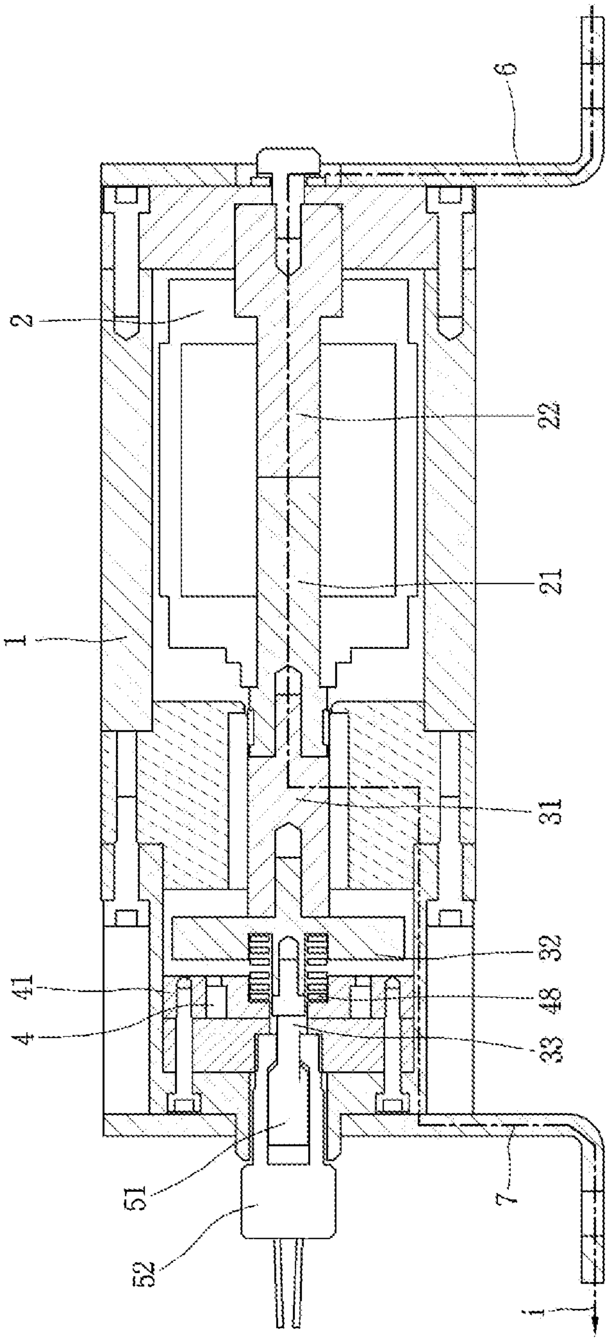
Fig. 2 Prior Art
Figure 3:
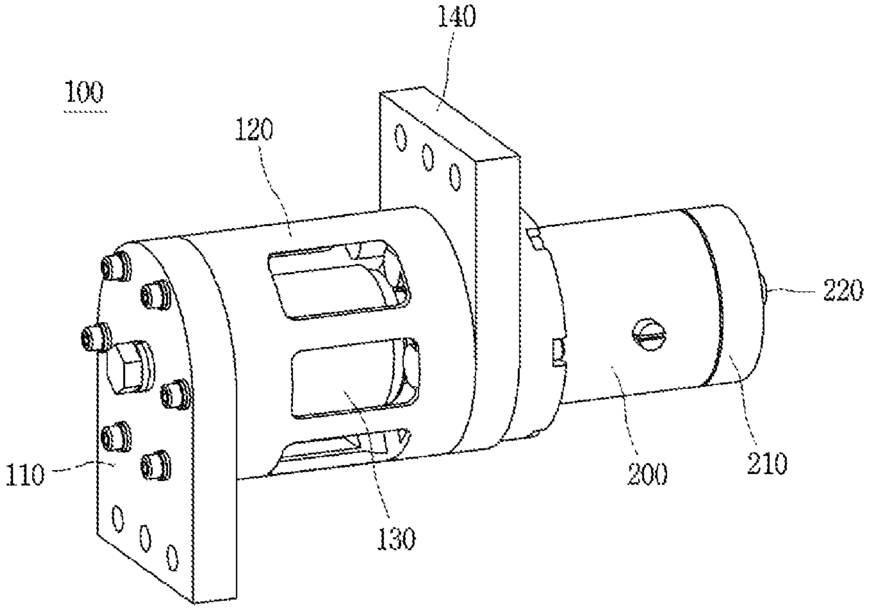
FIG. 3 is a perspective view of a bypass switch for an HVDC transmission module in accordance with one implementation of the present disclosure.
Figure 4:
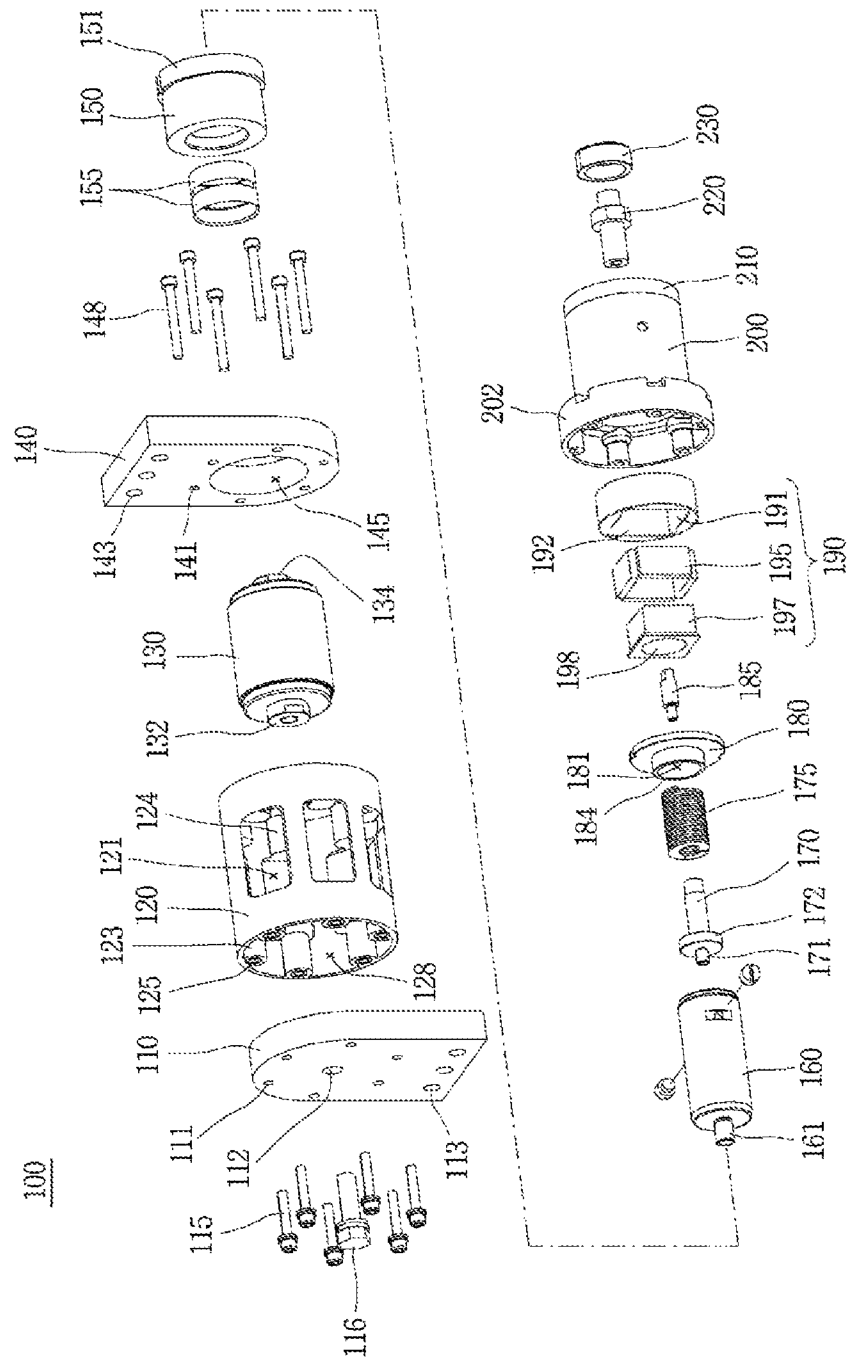
FIG. 4 is an exploded perspective view of FIG. 3.

FIG. 3 is a perspective view of a bypass switch for an HVDC transmission module in accordance with one implementation of the present disclosure, and FIG. 4 is an exploded perspective view of FIG. 3. Hereinafter, a bypass switch in accordance with each implementation of the present disclosure will be described in detail with reference to the accompanying drawings.

In the description of the present disclosure, a direction in which a first bus bar 110 is disposed based on a longitudinal direction of the case 120 may be referred to as a front side (front surface), and a direction in which a second bus bar 140 is disposed is referred to as a rear side (rear surface).

A bypass switch according to one implementation of the present disclosure may include a case 120 in which a hollow part 128 is formed, a first bus bar 110 coupled to a front end of the case 120 and connected to a power source, a second bus bar 140 coupled to a rear end of the case 120 and connected to a load, a vacuum interrupter 130 including a fixed contact 132 connected to the first bus bar 110, and a movable contact 134 brought into contact with or separated from the fixed contact 132 while being connected to the second bus bar 140, an insulating cover 200 coupled to a rear surface of the second bus bar 140 and having an accommodation part 201 therein, a movable part extension rod 160 installed in the accommodation part 201 of the insulating cover 200, and an actuator 220 disposed on a rear portion of the insulating cover 200 to supply power for moving the movable part extension rod 160.

The cover 120 may define appearance of the bypass switch 100. The case 120 may be formed in a cylindrical shape. The case 120 may be made of an insulating material.

The case 120 may have a hollow part 128 in which other components can be accommodated. The vacuum interrupter 130 and the movable part extension rod 160 may be installed in the hollow part 128.

A plurality of ventilation holes 121 may be formed through an outer circumferential surface of the case 120.

The case 120 may be provided with a plurality of fixing parts 123 and 124 along its inner circumferential surface. The fixing parts 123 and 124 may be provided in both end portions of the case 120, respectively. Screw holes 125 may be respectively formed in the fixing parts 123 and 124.

The first bus bar 110 may be provided. The first bus bar 110 may be formed flat. The first bus bar 110 may be coupled to the front end of the case 120.

The first bus bar 110 may be provided with a plurality of first coupling holes 111 at positions corresponding to the fixing parts 123 of the case 120.

A fixed contact hole 112 for coupling the fixed contact 132 may be formed in a central portion of the first coupling holes 111 of the first bus bar 110.

First mounting holes 113 for fixedly connecting to other components may be formed in the first bus bar 110.

The first bus bar 110 may be connected to a power supply and may serve as a path through which a current flows.

The first bus bar 110 may be coupled to the case 120 by first coupling members 115. The first coupling members 115 may be coupled to the first coupling holes 111 of the first bus bar 110 and the fixing parts 123 of the case 120.

The second bus bar 140 may be provided. The second bus bar 140 may be formed flat. The second bus bar 140 may be coupled to the rear end of the case 120.

The second bus bar 140 may be provided with a plurality of second coupling holes 141 at positions corresponding to the fixing parts 124 of the case 120.

Second mounting holes 143 for fixedly connecting to other components may be formed in the second bus bar 140.

The second bus bar 140 may be connected to a load and may serve as a path through which a current flows.

The second bus bar 140 may be provided with a contactor connection part 145 formed as a through hole. A multi-contactor 155 and a multi-contactor socket 150 may be inserted into the contactor connection part 145.

The vacuum interrupter 130 may include a fixed contact 132 disposed at one end and a movable contact 134 disposed at another end to be brought into contact with or separated from the fixed contact 132.

The vacuum interrupter 130 may be installed in the case 120. The vacuum interrupter 130 may be disposed in the hollow part 128 of the case 120, and protected and supported by the case 120. The vacuum interrupter 130 may be installed such that its outer circumferential surface, except for both end surfaces where the fixed contact 132 and the movable contact 134 are disposed, has a predetermined distance from the case 120. That is, an inner diameter of the case 120 may be larger than an outer diameter of the vacuum interrupter 130. Accordingly, the vacuum interrupter 130 may be cooled by air entering through the ventilation holes 121 of the case 120.

The fixed contact 132 may be fixed to the first bus bar 110 by a fixed contact coupling member 116.

The movable contact 134 may be coupled to the movable part extension rod 160. An insertion groove 135 may be formed in a rear end part of the movable contact 134.

A multi-contactor socket 150 may be provided. The multi-contactor socket 150 may be inserted into the contactor connection part 145. The multi-contactor socket 150 may be formed in a cylindrical shape. A support part 151 may be stepped with a large diameter on a rear end part of the multi-contactor socket 150, to be installed in contact with the rear surface of the second bus bar 140. The multi-contactor socket 150 may provide a space into which the movable part extension rod 160 is inserted, and support the movable part extension rod 160 and the movable contact 134.

A contactor insertion groove 152 into which the multi-contactor 155 can be partially inserted may be formed in an inner circumferential surface of the multi-contactor socket 150. The contactor insertion groove 152 may be formed in a shape of an annular groove.

A multi-contactor 155 may be provided. The multi-contactor 155 may be provided in plurality. The multi-contactors 155 may be inserted into the multi-contactor socket 150. The multi-contactors 155 may be inserted into the contactor insertion groove 152 of the multi-contactor socket 150. The multi-contactors 155 may be provided to improve current-carrying performance between the multi-contactor socket 150 and the movable part extension rod 160. In addition, the multi-contactors 155 may closely support the movable part extension rod 160. The multi-contactors 155 may be formed of an elastic conductor in order to stably maintain electrical connection with the multi-contactor socket 150 even when the movable part extension rod 160 moves. The multi-contactors 155 may be configured as a plurality of leaf spring groups disposed to form an annular shape (although not shown in detail).

The movable part extension rod 160 may be inserted through the multi-contactor socket 150 to be coupled to the movable contact 134. The movable part extension rod 160 may push the movable contact 134 to come in contact with the fixed contact 132.

An extension rod protrusion 161 may protrude from a front end of the movable part extension rod 160, to be inserted into the insertion groove 135 formed in the movable contact 134. Accordingly, the movable part extension rod 160 and the movable contact 134 may move integrally.

An operation part 162 that is formed in a shape of a groove open rearward to receive components may be formed in the movable part extension rod 160. That is, the movable part extension rod 160 may be formed in a cylindrical shape. A push rod 170, a contact spring 175, and a latch plate 180 may be inserted into the operation part 162. The operation part 162 may provide a space in which the contact spring 175 and the like can operate.

A push rod fixing groove 163 may be formed in a front end of the operation part 162, and a coupling protrusion 171 of the push rod 170 may be inserted into the push rod fixing groove 163.

A latch coupling part 164 that is stepped with a large inner diameter may be formed in a rear end of the operation part 162. The latch plate 180 may be coupled to the latch coupling part 164.

The push rod 170 may be provided. The push rod 170 may be moved by power generated in the actuator 220 so as to move the movable contact 134 via the movable part extension rod 160.

The push rod 170 may be provided on its front end part with a pressing plate 172 brought into contact with a front surface of the operation part 162 to transfer force to the operation part 162, and a coupling protrusion 171 inserted into the push rod fixing groove 163.

A coupling groove 173 into which an insulating push rod 185 is inserted may be formed in a rear end part of the push rod 170.

The push rod 170 may be disposed to be spaced apart from a magnetic latch 190. That is, the rear end part of the push rod 170 may be located ahead of the front end part of the magnetic latch 190. Accordingly, interference due to attractive force between the push rod 170 and the magnetic latch 190 can be avoided.

The contact spring 175 may be provided. The contact spring 175 may be provided to apply pressure to the push rod 170. Pressure applied by the contact spring 175 to the push rod 170 may act as contact pressure for pressing the movable contact 134 through the movable part extension rod 160. In the closed state of the bypass switch, the contact pressure may prevent the contacts 132 and 134 from being separated from each other due to external force applied to the contacts 132 and 134.

The contact spring 175 may have a front end in contact with the pressure plate 172 of the push rod 170 and a rear end in contact with a central pipe part 211 of an end cover 210. Since the end cover 210 is fixed to the insulating cover 200, the contact spring 175 may apply force in a direction of pressing the push rod 170.

The latch plate 180 may be provided. The latch plate 180 may be fixed to the movable part extension rod 160 and may be attracted to a permanent magnet 195 so that the movable contact 134 is separated from the fixed contact 132. Accordingly, the open state of the bypass switch can be maintained. The latch plate 180 may preferably be formed of a magnetic material.

A first through hole 181 may be formed through a central portion of the latch plate 180.

The latch plate 180 may be provided with a rod coupling part 184 in a shape of a pipe formed around the first through hole 181. The rod coupling part 184 may protrude from one surface (front surface) of the latch plate 180.

The rod coupling part 184 of the latch plate 180 may be inserted into the latch coupling part 164 of the movable part extension rod 160.

A part of the rear end part of the push rod 170 and a part of the rear end part of the contact spring 175 may be inserted into the rod coupling part 184, namely, the first through hole 181 of the latch plate 180.

An insulating push rod 185 may be provided. The insulating push rod 185 may be coupled to the coupling groove 173 of the push rod 170 to move the push rod 170 by explosive force of the actuator 220. The insulating push rod 185 may be formed of an insulating material to improve the insulating performance between the push rod 170 and the magnetic latch 190.

The magnetic latch 190 may be provided. The magnetic latch 190 may be provided with an outer holder 191, an inner holder 197, and a permanent magnet 195. The magnetic latch 190 may serve to attract the latch plate 180. The outer holder 191 and the inner holder 197 may preferably be formed of a magnetic material.

The outer holder 191 and the inner holder 197 may be coupled to a rear surface of the accommodation part 201 of the insulating cover 200.

The outer holder 191 may be formed in a circular shape, and may be provided with a second through hole 192 formed in a rectangular shape through its central portion.

The inner holder 197 may be formed in a rectangular shape, and may be provided with a third through hole 198 formed in a circular shape through its central portion.

A permanent magnet 195 may be fixed between the outer holder 191 and the inner holder 197. The permanent magnet 195 may be configured as a flat magnet. The permanent magnet 195 may be provided in plurality, for example, by four. The permanent magnet 195 may be disposed such that one surface of the permanent magnet 195 comes in contact with one surface of the second through hole 192 of the outer holder 191 and another surface of the permanent magnet 195 comes in contact with an outer surface of the inner holder 197. Accordingly, the permanent magnet 195 may be supported by the outer holder 191 and the inner holder 197.

In a normal state, the permanent magnet 195 may attract the latch plate 180 so that the movable contact 134 is separated from the fixed contact 132. Accordingly, the open state of the bypass switch can be maintained.

Figure 5:
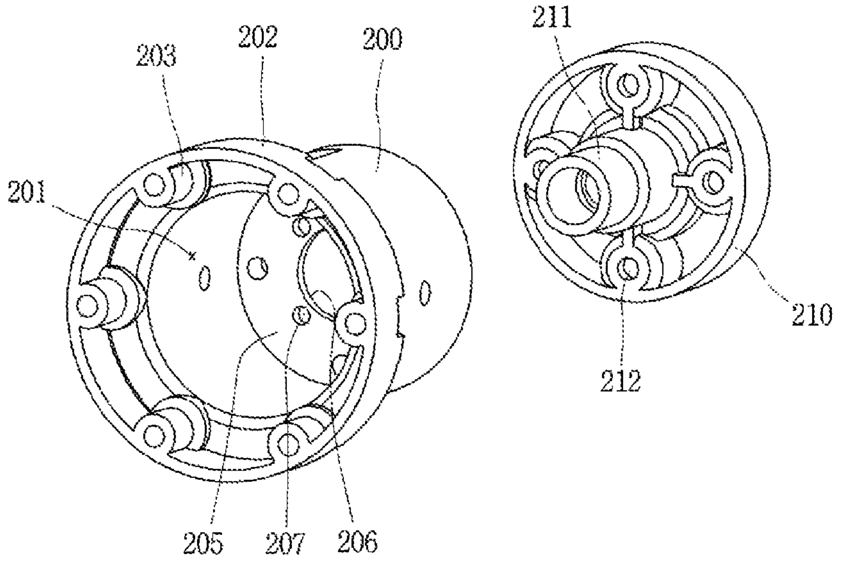
FIG. 5 is a perspective view illustrating an insulating cover and an end cover illustrated in FIG. 4.

FIG. 5 is a perspective view illustrating the insulating cover and the end cover viewed from a different direction. Hereinafter, a description will be given further with reference to FIG. 5.

The insulating cover 200 may be provided to improve insulation between a circuit part including the bus bars 110 and 140 and the actuator 220. The insulating cover 200 may be particularly provided for electrical insulation between the actuator 220 and the second bus bar 140. Accordingly, an insulation design for an external firing device may be unnecessary. Also, since a firing signal based on the ground is received, the probability of generating noise in the firing signal can be reduced, thereby enabling an accurate and stable operation of the bypass switch.

The insulating cover 200 may be disposed at the rear of the second bus bar 140. Accordingly, the circuit part in which a current supplied from a power source through the first bus bar 110 flows to a load through the second bus bar 140 can be separated from the actuator 220, thereby securing sufficient insulation between the circuit part and the actuator.

The insulating cover 200 may be formed in a cylindrical shape with a front opening. A movable part except for the movable contact 134, namely, the movable part extension rod 160, the push rod 170, the contact spring 175, the latch plate 180, and the insulating push rod 185 may be accommodated in the accommodation part 201 of the insulating cover 200.

A front end part 202 of the insulating cover 200 may be stepped to have an increased diameter. This is to facilitate the assembly of the insulating cover 200 and the second bus bar 140.

A fixing part 203 to be fixed to the second bus bar 140 may be formed on the front end part 202 of the insulating cover 200. The insulating cover 200 may be fixedly coupled to the second bus bar 140 by second coupling members 148 coupled to the fixing part 203.

The end cover 210 and the outer holder 191 may be fixed to a rear surface 205 of the insulating cover 200. A cover through hole 206 may be formed through a central portion of the rear surface 205 of the insulating cover 200. Fixing holes 207 for fixing the end cover 210 and the holders 191 and 197 may be formed in the rear surface 205 of the insulating cover 200. The end cover 210 and the holders 191 and 197 may be fixedly coupled to the rear surface 205 of the insulating cover 200 by third coupling members 218.

The end cover 210 may be coupled to the rear of the insulating cover 200. The end cover 210 may be formed of an insulating material. The end cover 210 may serve to insulate between the contact spring 175 and the actuator 220.

The central pipe part 211 may protrude from the end cover 210. The central pipe part 211 may be inserted into the cover through hole 206 of the insulating cover 200 to support the contact spring 175. Here, a front end part of the central pipe part 211 may protrude forward to be located ahead of the front end part of the magnetic latch 190. Accordingly, interference due to magnetic force between the push rod 170 and the contact spring 175 and the magnetic latch 190 can be avoided.

A mounting part 215 having a shape of a groove may be formed in a rear surface of the end cover 210. The actuator 220 may be installed in the mounting part 215 from the rear surface of the end cover 210, and thus may partially be inserted into the central pipe part 211.

The actuator 220 may be an explosive power source. The actuator 220 may be exploded by an external firing signal when a fault current is generated and push the insulating push rod 185 to generate power to move the movable contact 134. Since the actuator 220 generates power by gas pressure, it may also be referred to as an inflator.

The actuator 220 may be provided with a piston 221. When the actuator 220 is exploded, the piston 221 may be moved forward by gas pressure so as to push the insulating push rod 185.

A cap 230 may be coupled to the rear of the actuator 220. The cap 230 may be inserted into the mounting part 215 of the actuator 220 to support the actuator 220.

Figure 6:
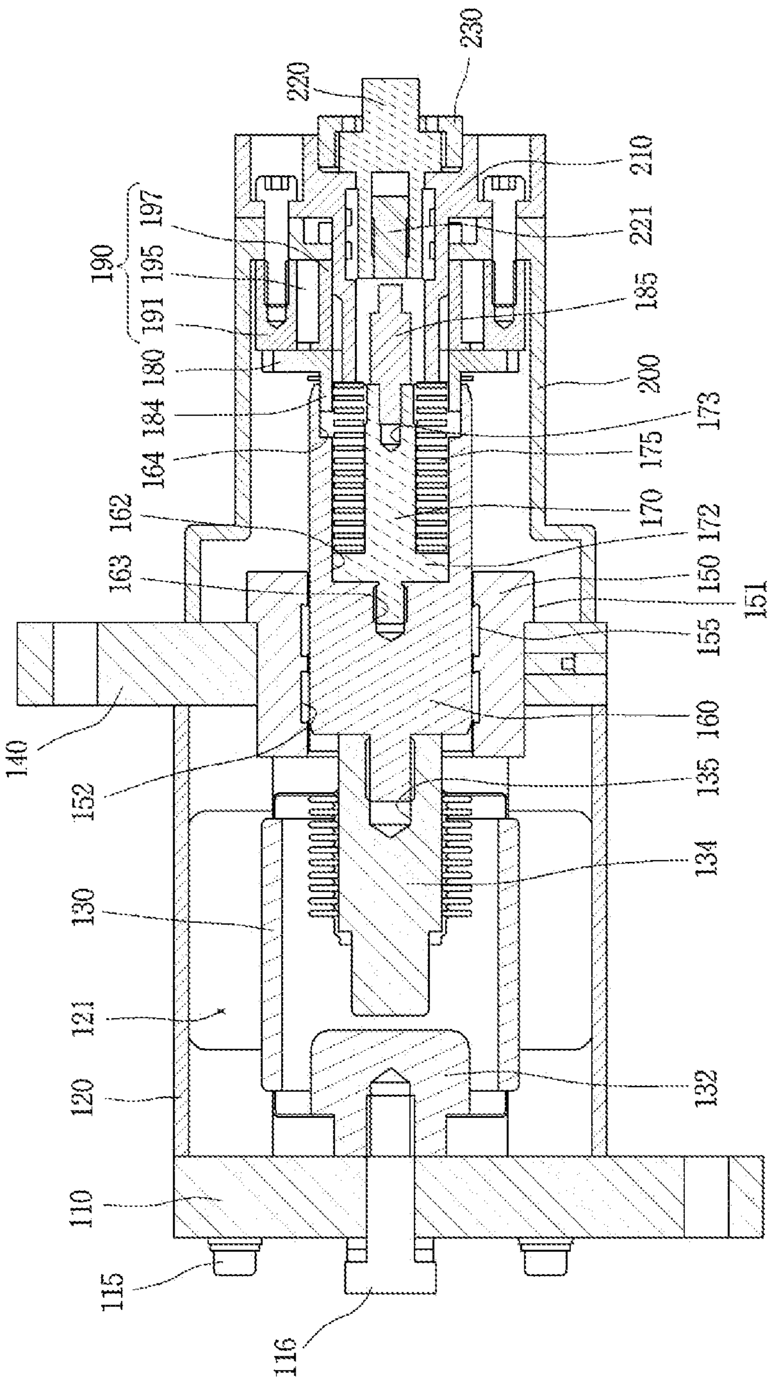
FIGS. 6 and 7 are views illustrating operating states of a bypass switch for an HVDC transmission module in accordance with one implementation of the present disclosure.
Figure 7:
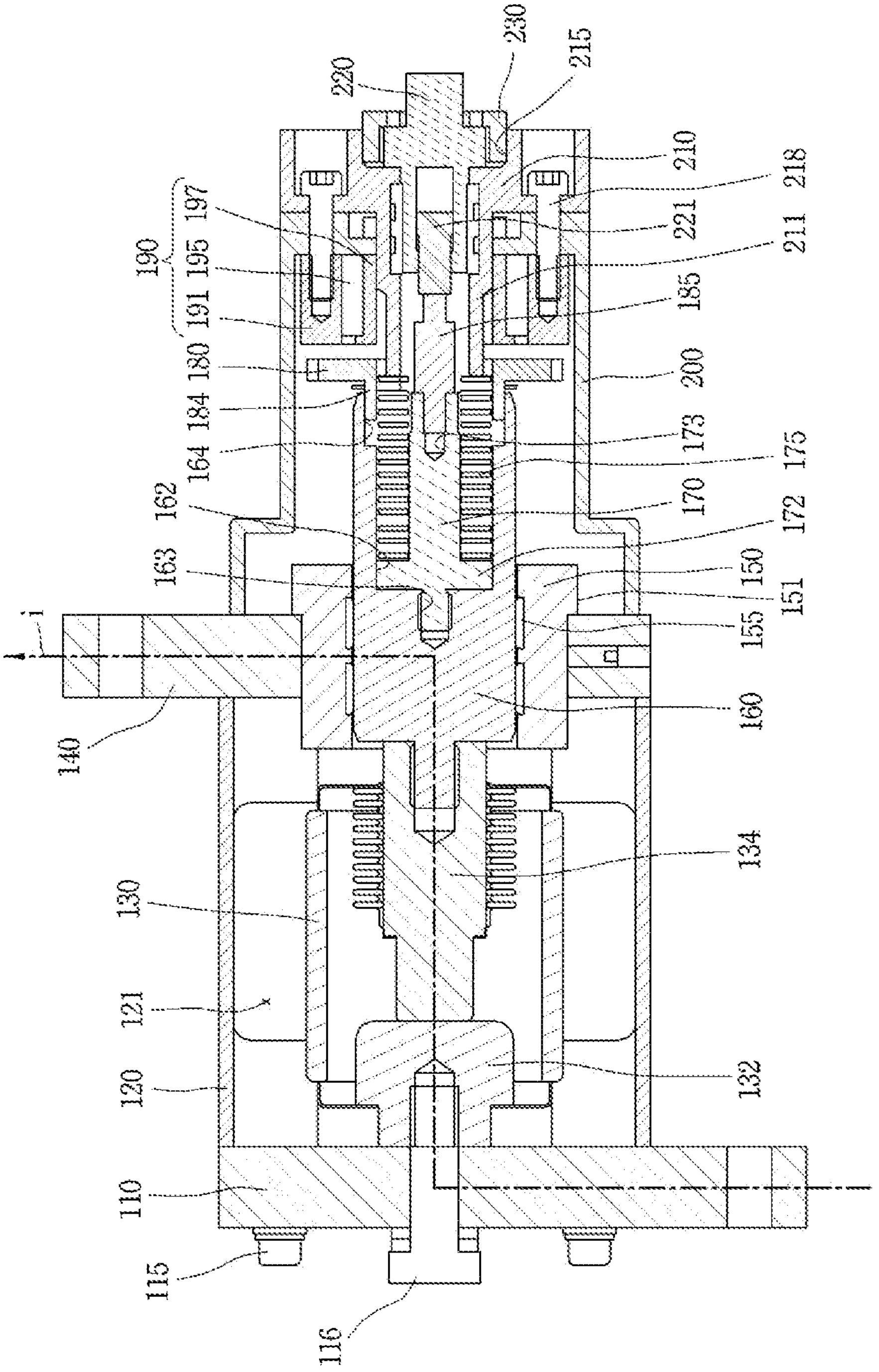

Hereinafter, operations of the bypass switch according to one implementation of the present disclosure will be described. The description will be mainly given with reference to FIGS. 6 to 7. FIG. 6 illustrates an open state and FIG. 7 illustrates a closed state.

In a normal state in which each sub-module operates normally, the latch plate 180 may be attracted by magnetic force of the magnetic latch 190 to be brought into contact with the holders 191 and 197. Accordingly, the movable part extension rod 160 connected to the latch plate 180 and the movable contact 134 connected to the movable part extension rod 160 may also be moved rearward, such that the contacts 132 and 134 can be maintained in the open state.

Therefore, no current may flow through the bypass switch.

In case where a failure occurs in any sub-module, when such a failure is detected and an electric signal is input from outside, a gas generator may operate in the actuator 52 to generate gas pressure. The piston 221 may be pushed forward by the gas pressure to push the insulating push rod 185. In cooperation with this, the push rod 170, the movable part extension rod 160, and the movable contact 134 may overcome attractive force between the latch plate 180 and the permanent magnet 195, thereby all moving forward.

Accordingly, the movable contact 134 may be brought into contact with the fixed contact 132 such that a current can flow.

That is, the current may flow through the bypass switch to create a current bypass that excludes the corresponding sub-module.

On the other hand, the contact spring 175 may be expanded in the operation part 162 of the movable part extension rod 160 to apply contact pressure to the contacts 132 and 134.

In a bypass switch according to one implementation of the present disclosure, an insulating cover may be applied between an actuator serving as a power source of a closing operation of a movable contact and a second bus bar, through which a high-pressure current flows, thereby securing insulation. That is, a circuit part including a first bus bar connected to a power source and a second bus bar connected to a load, and an actuator part can be insulated from each other by the insulating cover.

Accordingly, an insulation design for an external firing device connected to the actuator may be unnecessary. Also, the actuator may receive a firing signal (electrical signal) based on the ground. This may result in reducing the probability of generating noise in the firing signal, thereby enabling an accurate and stable operation of the bypass switch.

Meanwhile, a movable part extension rod may be formed in a cylindrical shape to define a space for mounting and operating a contact spring. Therefore, a special spring having a large spring coefficient may not be required, and a commercially available spring can be applied.

This may improve contact pressure with respect to a movable contact, and reduce the weight of entire components.

In addition, an operating speed of the bypass switch can be improved, thereby reducing a closing time.

This may also facilitate a stroke control for the movable contact.

A latch plate may partially be inserted into the movable part extension rod so as to stably operate without shaking.

While the disclosure has been shown and described with reference to the foregoing preferred implementations thereof, it will be understood by those skilled in the art that various changes and modifications may be made without departing from the scope of the disclosure as defined by the appended claims. Therefore, the implementation disclosed in the present disclosure are not intended to limit the scope of the present disclosure but are merely illustrative, and it should be understood that the scope of the technical idea of the present disclosure is not limited by those implementations. That is, the scope of protection of the present disclosure should be construed according to the appended claims, and all technical ideas within the scope of equivalents thereof should be construed as being included in the scope of the present disclosure.

The invention claimed is:

1. A bypass switch comprising:

a case in which a hollow part is defined;

a first bus bar coupled to a front end of the case;

a second bus bar coupled to a rear end of the case;

a fixed contact disposed in the hollow part and connected to the first bus bar;

a movable contact disposed in the hollow part and connected to the second bus bar to be brought into contact with or separated from the fixed contact;

an insulating cover coupled to a rear surface of the second bus bar and having an accommodation part therein;

a movable part extension rod disposed in the accommodation part and coupled to the movable contact; and an actuator disposed on the rear of the insulating cover to apply power to move the movable part extension rod, wherein a fixing part is stepped with an increased diameter on a front end part of the insulating cover, and wherein the insulating cover is integrally coupled to the second bus bar and the case by coupling members coupled to the fixing part.

2. The bypass switch of claim 1, wherein the second bus bar includes a contactor connection part implemented as a through hole, and wherein the bypass switch further comprises a multi-contactor socket inserted into the contactor connection part, formed in a cylindrical shape to surround and support the movable part extension rod.

3. The bypass switch of claim 2, further comprising a multi-contactor closely disposed between the multi-contactor socket and the movable part extension rod.

4. The bypass switch of claim 1, further comprising an end cover coupled to the rear of the insulating cover and having a mounting part in a shape of a groove in which the actuator is disposed.

5. The bypass switch of claim 4, further comprising a contact spring disposed between the movable part extension rod and the end cover to apply contact pressure to the movable contact.

6. The bypass switch of claim 5, wherein the end cover is provided with a central pipe part inserted into a cover through hole of the insulating cover to support the contact spring.

7. The bypass switch of claim 6, wherein the movable part extension rod is provided with an operation part formed in a shape of a groove open rearward, and wherein the bypass switch further comprises a push rod disposed on a front surface of the operation part to receive force of the contact spring.

8. The bypass switch of claim 4, wherein the mounting part is provided with a cap to fix the actuator.

9. The bypass switch of claim 1, further comprising:

a permanent magnet coupled to a rear surface of the accommodation part; and a latch plate coupled to the movable part extension rod, and attracted to the permanent magnet in a normal state such that the movable contact is separated from the fixed contact.

10. The bypass switch of claim 9, further comprising an outer holder and an inner holder respectively disposed on both side surfaces of the permanent magnet to support the permanent magnet.

11. A bypass switch comprising:

a case in which a hollow part is defined;

a first bus bar coupled to a front end of the case;

a second bus bar coupled to a rear end of the case;

a fixed contact disposed in the hollow part and connected to the first bus bar;

a movable contact disposed in the hollow part and connected to the second bus bar to be brought into contact with or separated from the fixed contact;

an insulating cover coupled to a rear surface of the second bus bar and having an accommodation part therein;

a movable part extension rod disposed in the accommodation part and coupled to the movable contact;

an actuator disposed on the rear of the insulating cover to apply power to move the movable part extension rod;

an end cover coupled to the rear of the insulating cover and having a mounting part in a shape of a groove in which the actuator is disposed;

a contact spring disposed between the movable part extension rod and the end cover to apply contact pressure to the movable contact, wherein the end cover is provided with a central pipe part inserted into a cover through hole of the insulating cover to support the contact spring.

12. A bypass switch comprising:

a case in which a hollow part is defined;

a first bus bar coupled to a front end of the case;

a second bus bar coupled to a rear end of the case;

a fixed contact disposed in the hollow part and connected to the first bus bar;

a movable contact disposed in the hollow part and connected to the second bus bar to be brought into contact with or separated from the fixed contact;

an insulating cover coupled to a rear surface of the second bus bar and having an accommodation part therein;

a movable part extension rod disposed in the accommodation part and coupled to the movable contact;

an actuator disposed on the rear of the insulating cover to apply power to move the movable part extension rod; and an end cover coupled to the rear of the insulating cover and having a mounting part in a shape of a groove in which the actuator is disposed;

wherein the mounting part is provided with a cap to fix the actuator.

* * * * *